United States Patent [19]

Madeley et al.

[11] Patent Number: 5,008,561

[45] Date of Patent: Apr. 16, 1991

[54] DEVICE DEPOWERING APPARATUS

[75] Inventors: David R. Madeley, Staffordshire; Mark S. Binet, Gloucestershire, both of Great Britain

[73] Assignee: Lucas Industries, Birmingham, England

[21] Appl. No.: 492,773

[22] Filed: Mar. 13, 1990

[30] Foreign Application Priority Data

Mar. 16, 1989 [GB] United Kingdom ............... 8906066
Jun. 9, 1989 [GB] United Kingdom ............... 8913289

[51] Int. Cl.$^5$ .......................... H02J 1/00; G05B 9/03
[52] U.S. Cl. .................................. 307/80; 307/41; 318/564
[58] Field of Search ............ 318/293, 294, 563, 564, 318/568.24; 307/43, 64, 65, 66, 67, 68, 69, 70, 80, 85, 86, 38, 41

[56] References Cited

U.S. PATENT DOCUMENTS

| | | | |
|---|---|---|---|
| 2,630,554 | 3/1953 | Kuka ................................. | 318/293 X |
| 3,509,357 | 4/1970 | Studtmann ........................ | 307/64 |
| 3,530,355 | 9/1970 | Hodgkins .......................... | 318/564 |
| 3,769,571 | 10/1973 | Wilkinson ........................ | 307/64 X |
| 3,807,666 | 4/1974 | Devlin .............................. | 318/564 X |
| 4,120,469 | 10/1978 | Westermeier .................... | 318/564 X |
| 4,130,241 | 12/1978 | Meredith et al. ................ | 318/564 X |
| 4,146,801 | 3/1979 | Vali et al. ......................... | 18/563 X |
| 4,447,768 | 5/1984 | Terui ................................. | 318/293 |
| 4,527,103 | 7/1985 | Kade ................................. | 318/293 |

Primary Examiner—Bentsu Ro
Attorney, Agent, or Firm—Staas & Halsey

[57] ABSTRACT

A depowering apparatus for controlling selection and deselection of devices, such as a pair of torque motors, comprises two channels. Each channel has a normally open switch in series with a normally closed switch connecting a power supply line to the torque motor. A control circuit in each channel closes the normally open switch of that channel and opens the normally closed switch of the other channel in response to a channel select signal so as to ensure that each of the torque motors can be depowered to allow the other to take control.

14 Claims, 3 Drawing Sheets

DEVICE DEPOWERING APPARATUS

BACKGROUND OF THE INVENTION

This invention relates to a device depowering apparatus. Such an apparatus may be used as part of a two lane control system in aerospace applications, for instance with each lane controlling a torque motor or solenoid. In such systems, each function is performed by two components, one in each lane. Only one of the lanes has control at any time, the other lane acting as a back-up and taking control in the event of a failure in the one lane.

SUMMARY OF THE INVENTION

According to a first aspect of the invention, there is provided a device depowering apparatus, comprising first and second channels, each of which comprises switch means connected in a device power supply line and control means for closing the switch means and supplying a channel deselect signal to the other channel in response to a channel select signal, and for opening the switch means in response to a channel deselect signal from the other channel.

Preferably the switch means of each channel comprises normally open contacts of an electromagnetic relay.

According to a second aspect of the invention, there is provided a device depowering apparatus, comprising first and second channels, each of which comprises first and second switches connected in series in a device power supply line and control means for closing the first switch and supplying a channel deselect signal to the other channel in response to a channel select signal, and for opening the second switch in response to a channel deselect signal from the other channel.

It is thus possible to provide an apparatus for depowering either of two devices, such as torque motors or solenoids, which apparatus is immune from any single fault and continues to function correctly. Either of the channels is deselected by the absence of a select signal for that channel or by the presence of a deselect signal from the other channel, so that the device is deselected even if one of these signals fails to appear because of a fault.

Preferably the first switch of each channel comprises normally open contacts of a first electromagnetical relay and the second switch of each channel comprises normally closed contacts of a second electromagnetic relay. Preferably each control means is arranged to produce the channel deselect signal as an alternating or pulse signal and includes a transformer-isolated drive circuit for driving the second relay. Each drive circuit preferably comprises an isolation transformer whose primary winding receives the channel deselect signal and whose secondary winding is connected via rectifying and smoothing means to the gate of a power field effect transistor arranged to control current through the second relay. Preferably each control means includes a deselect signal producing circuit including an AND gate having a first input for receiving clock pulses and a second input for receiving the channel select signal.

Such a device depowering apparatus is thus suitable for applications in which a high degree of reliability is required. Where systems are duplicated for safety, it is essential that a faulty system can be disabled so that a fault-free system is unimpeded and can take control. This is particularly important in aerospace applications to which the device depowering apparatus is well-suited, one such application being with the torque motors which control a jet engine fuel metering valve.

BRIEF DESCRIPTION OF THE DRAWINGS

The invention will be further described, by way of example, with reference to the accompanying drawing, in which.

The system illustrated in FIG. 1 comprises two identical lanes A and B. The construction of only one lane will therefore be described. The same reference numerals followed by a prime refer to the corresponding parts in the other lane and channel.

DESCRIPTION OF THE PREFERRED EMBODIMENTS

Figure 1:
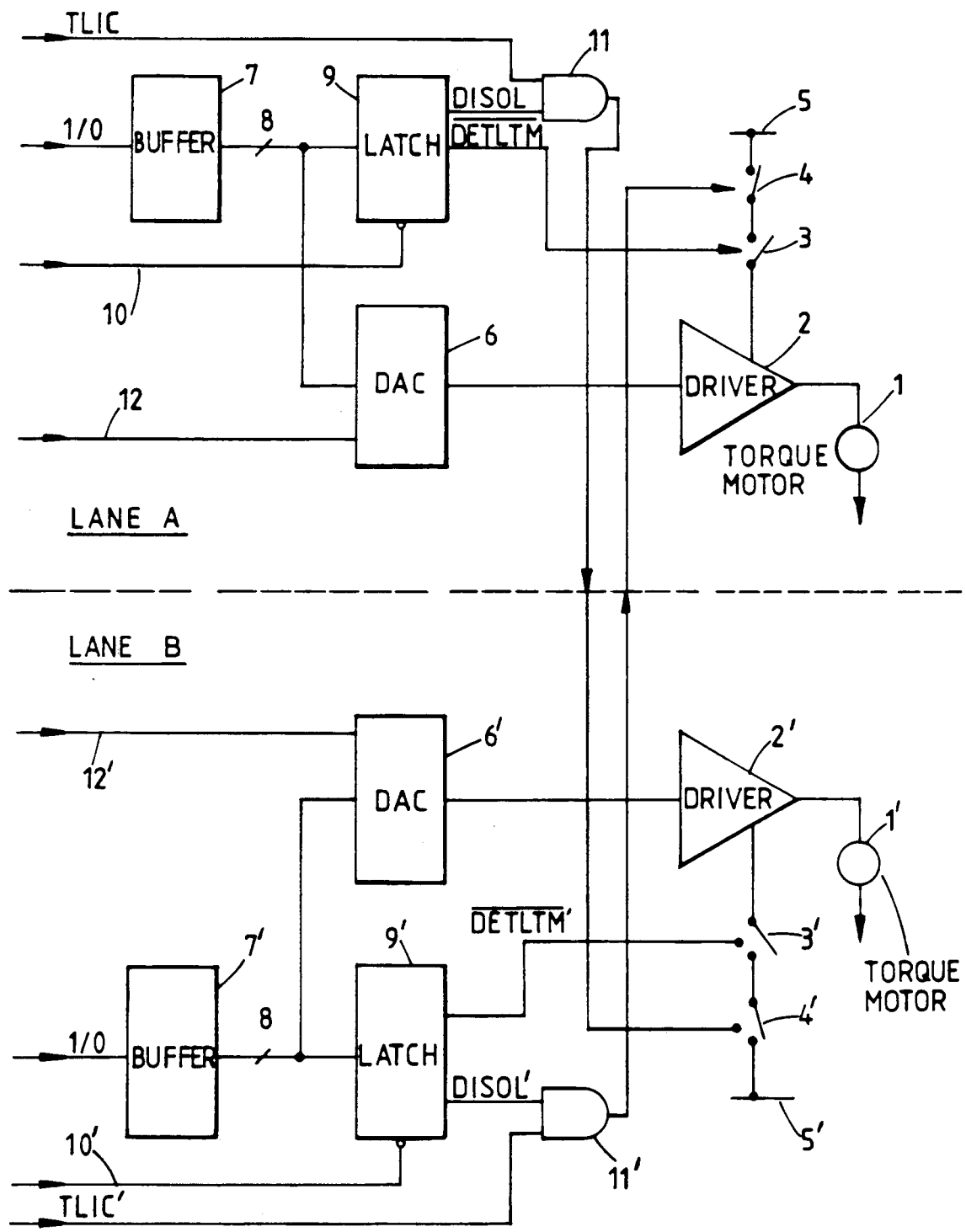
FIG. 1 is a block diagram of part of a two lane torque motor control system including a torque motor depowering apparatus constituting a first embodiment of the invention.

Lane A of the control system shown in FIG. 1 comprises a torque motor 1 connected to the output of a driver 2. The driver 2 is connected via normally open relay contacts 3 and normally closed relay contacts 4 to a power supply line 5 for supplying power to the driver 2 and the torque motor 1. The driver 2 has an input connected to the output of a digital to analog converter 6 of the twelve bit type. The digital inputs of the converter 6 are connected via an eight bit bus and a buffer 7 to an input/output highway I/O which carries input data for controlling, via the converter 6 and the driver 2, the current through the torque motor 1 and hence the torque produced by the motor. The converter has a latch input connected to an input line 12 which receives a control signal for latching new torque data into the converter 6 when such new data are present at the outputs of the buffer 7.

The outputs of the buffer 7 are also connected via the eight bit bus to the inputs of a latch 9, which has an inverted control input connected to an input line 10 for receiving a control signal. The control signal at the line 10 causes new control data to be latched into the latch 9 when such data are present at the outputs of the buffer 7. The latch 9 provides a first output signal $\overline{\text{DETLTM}}$ "de-energize this lane torque motor" which controls the relay contacts 3 such that, when this signal is at logic 0, the contacts are open whereas, when the signal is at logic 1, the contacts are closed. The latch provides a second output signal DISOL "disable other lane" which is supplied to a first input of an AND gate 11. The gate 11 has a second input which receives a signal TLIC "this lane in control". The output of the gate 11 controls the relay contacts 4' in the lane B such that, when the output signal is at logic 0, the contacts are closed whereas, when the output signal is at logic 1, the contacts are open.

During normal operation of the system, assuming that the lane A is in control, data latched in the latch 9' from the input/output highway I/O' by a control signal on the input 10' cause the signal $\overline{\text{DETLTM}}'$ to be at logic 0. The relay contacts 3' are therefore open and the torque motor 1' is depowered. The signal TLIC' is at logic 0 and the latch 9' produces a logic 0 as the signal DISOL'. The output of the AND gate 11' is therefore at logic 0 and the relay contacts 4 in the lane A are closed.

In the lane A, the latch 9 sets the signals DISOL and $\overline{\text{DETLTM}}$ to logic 1 and the signal TLIC supplied to the lane A is also at logic 1. The relay contacts 3 are therefore closed, allowing the supply of power from the supply line 5 to the driver 2 and the torque motor 1. The AND gate 11 has logic 1 at both its inputs and therefore supplies a logic 1 signal to the relay contacts 4' causing them to be opened.

The system is immune to the effects of a single fault in either lane and will still allow the depowering of the torque motor in the lane which is not in control. Thus, with the lane A in control as described above, if there is a fault in the lane B such that the signal $\overline{\text{DETLTM}}'$ is erroneously set to logic 1 and closes the contacts 3', the contacts 4' are held open by the output of the gate 11 in the lane A. Conversely, if one of the signals TLIC and DISOL is set erroneously to zero so that the relay contacts 4' remain closed, the signal $\overline{\text{DETLTM}}'$ opens the contacts 3' to depower the torque motor 1'. This is the case even if both signals TLIC and DISOL are in error. If one of the signals DISOL' and TLIC' is in error, the contacts 4 in the lane A remain closed so that the torque motor 1 is not depowered.

Figure 2:
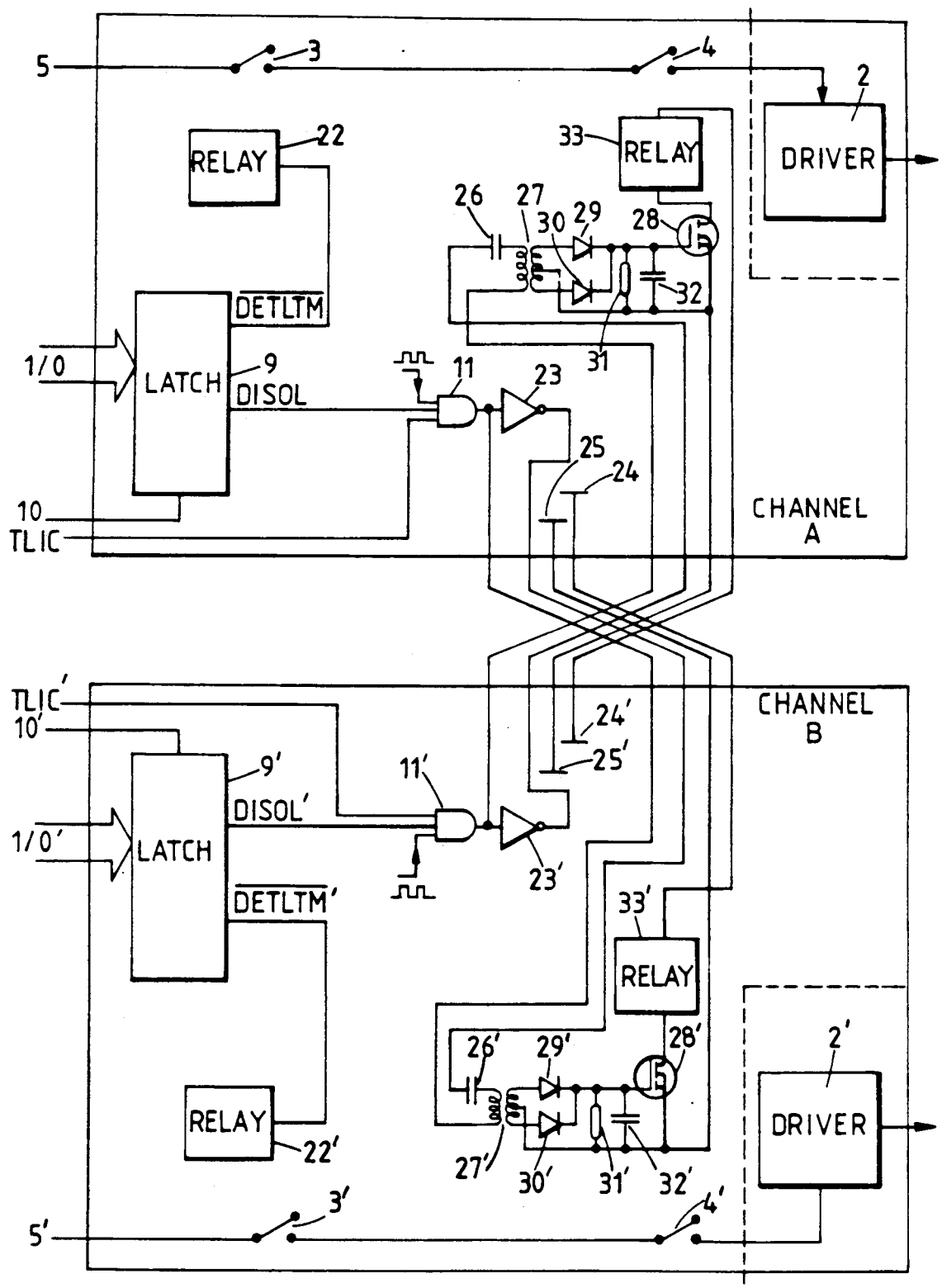
FIG. 2 is a more detailed diagram of the depowering apparatus shown in FIG. 1.

FIG. 2 shows the parts of the system of FIG. 1 which make up the torque motor depowering apparatus, together with the drivers 2 and 2'. FIG. 2 shows the apparatus in greater detail and thus includes some parts which are not shown in FIG. 1. Corresponding parts are referred to by the same reference numerals.

The signal $\overline{\text{DETLTM}}$ is supplied by the latch 9 to a relay 22 which controls the relay contacts 3. The AND gate 11 has a third input connected to a source of clock pulses. The output of the gate 11 is supplied to the channel B and to the input of an inverter 23 whose output is also supplied to the channel B. A power supply line 24 and a common line 25 are connected to the channel B.

The outputs of the gate 11' and the inverter 23' provide antiphase signals which are supplied via a dc-blocking capacitor 26 to the primary winding of an isolating transformer 27. The transformer has a secondary winding with a centre tap which is connected to the source of a power metal oxide silicon field effect transistor (MOSFET) 28 and to the common line 25' of the channel B. The ends of the secondary winding are connected to the anodes of rectifier diodes 29 and 30, whose cathodes are connected together and to the gate of the field effect transistor 28. A smoothing network comprising a resistor 31 and a capacitor 32 are connected in parallel between the source and gate of the field effect transistor 28. The drain of the field effect transistor is connected to one side of a relay 33 whose other side is connected to the supply line 24' in the channel B.

When the signals DISOL and TLIC are at logic 1, the clock pulses at the third input of the gate 11 are effectively passed by this gate, and are inverted by the inverter 23. Thus, an anti-phase or balanced channel deselect signal is supplied to the channel B. The signal is rectified by the diodes 29' and 30' and smoothed by the capacitor 32' and the resistor 31', and causes the field effect transistor 28' to conduct. A current therefore flows from the supply line 24 in the channel A through the transistor 28' and the coil of the relay 33' in the channel B, and back to the common line 25 in the channel A. The relay 33' is thus energised and opens the contacts 4' so as to ensure that the torque motor connected to the driver 2' is depowered. A frequency of 150 kHz for the clock pulses has proved satisfactory and allows a relatively compact transformer 27 and smoothing capacitor 32 to be used. This arrangement ensures that failure in the channel B cannot result in the relay 33 in the channel A being energized and thus depowering the torque motor of the selected lane A.

During normal operation, the signals TLIC' and DISOL' are at logic 0 so that the relay 33 is not energized and the contacts 4 remain closed. If there is a failure in the channel B, it is possible that both the signals DISOL' and TLIC' could go to logic level 1. However, a power supply failure always causes the 150 kHz clock signal to disappear so that no channel deselect signal passes through the transformer 27 and the relay 33 remains de-energized. The contacts 4 remain closed and the torque motor 1 of the fault-free lane A cannot be depowered.

If a power supply failure occurs in the controlling lane A, the 150 kHz clock signal in the lane A disappears. The relay 33' is therefore de-energized and the contacts 4' in the fault-free channel B are closed. This ensures that the torque motor 1' in the lane B is not depowered and is available as soon as the lane B is selected to assume control. In practice, the power supply failure is detected elsewhere and causes the signal TLIC to go to logic 0 and the signal TLIC' to go to logic 1. The lane B assumes control and ensures that the torque motor in the lane A is depowered.

It is possible for a fault to develop in the lane A such that the signals DISOL and $\overline{\text{DETLTM}}$ are both at logic 1 but with corrupt data being supplied to control the torque motor 1. This would result in the torque motor 1' of the lane B being depowered with the torque motor 1 of the lane A supplying a corrupt output. However, such a fault would normally be detected elsewhere so as to change the signal TLIC to logic 0 and the signal TLIC' to logic 1, thus ensuring that the lane B takes control and the torque motor 1 of the lane A is depowered.

Operation in the case where the lane A is depowered and the lane B is in control is entirely symmetrical with respect to the reverse operation as described hereinbefore, and will not therefore be described.

Figure 3:
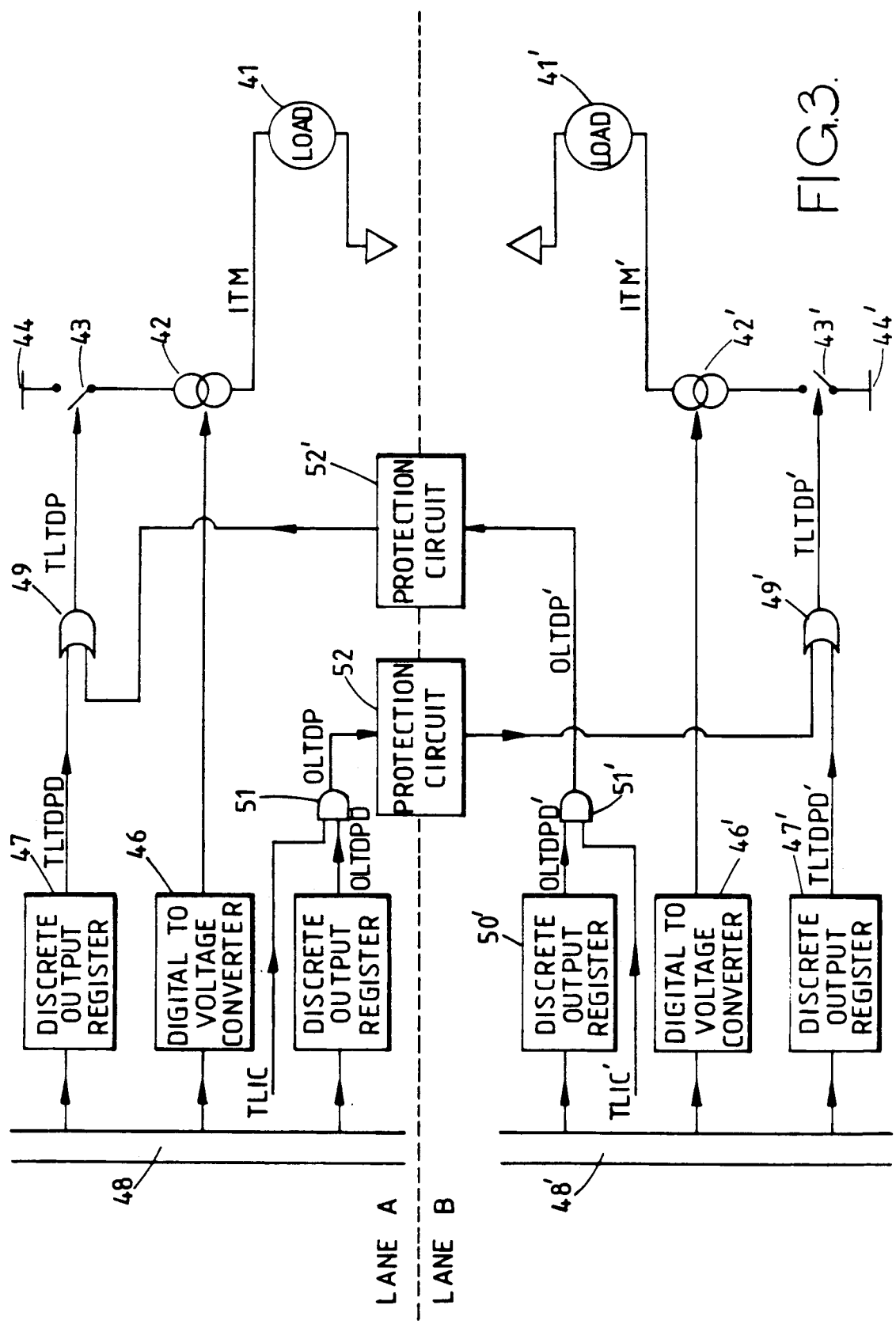
FIG. 3 is a block diagram of part of a two lane torque motor control system including a torque motor depowering apparatus constituting a second embodiment of the invention.

As in FIG. 1 the system illustrated in FIG. 3 comprises two identical lanes A and B so that the construction of only one lane will therefore be described with the same reference numerals followed by a prime referring to the corresponding parts in the other lane and channel.

Lane A of the control system shown in FIG. 3 comprises a load 41, such as a solenoid or torque motor, connected to the output of a driver 42. In this case, the load 41 is a torque motor, and the driver 42 supplies a torque motor current ITM which is dependent on an input voltage to the driver 42. The driver 42 is connected via normally closed relay contacts 43 to a power supply line 44 for supplying power to the driver 42 and the torque motor 41. The driver 42 has an input connected to the output of a digital to voltage converter 46 of the twelve bit type. The convertor 46 receives digital torque demand values from an input/output highway 48 and uses each value to start and stop a clock to provide a pulse width modulated signal which is then averaged by filtering.

A discrete output register 47 has an input connected to the highway 48 and an output which supplies an output signal "this lane depower" TLTDPD to a first input of an OR gate 49. The OR gate 49 has an output which controls the relay contacts 43 by a signal TLTDP such that the contacts 43 are open when the signal TLTDP is at logic level 1. The gate 49 has a second input which receives a depowering signal OLTDP' from the lane B via a protection circuit 52'.

Another discrete output register 50 has an input connected to the highway 48 and an output which supplies an output signal "other lane depower" OLTDPD to a first input of an AND gate 51. The AND gate 51 has a second input which receives a signal "this lane in control" TLIC. The AND gate 51 supplies the signal OLTDP via the protection circuit 52 to the lane B. The circuit 52 may comprise a current limiting resistor.

During normal operation of the system, assuming that the lane A is in control, the signals TLIC' and OLTDPD' supplied to the lane B are at logic level 0 so that the signal OLTDP' received by the lane A via the protection circuit 52' is at logic level 0. The signal TLTDPD' is at logic level 1 so that the signal TLTDP' is at logic level 1 and the contacts 43' are open, thus depowering the torque motor 41'.

In the lane A, the signal TLTDPD is at logic level 0. Both inputs of the OR gate 49 are at logic level 0 so that the output is at logic level 0 and the contacts 43 are closed. The signals TLIC and OLTDPD at the inputs of the AND gate 51 are at logic level 1, so that the signal OLTDP supplied via the protection circuit 52 to the OR gate 49' is at logic level 1.

The system is immune to the effects of a single fault in either lane and will still allow the depowering of the torque motor in the lane which is not in control. Thus, with the lane A in control as described above, if there is a fault in the lane B such that the signal TLTDPD' is erroneously set at logic level 0, the contacts 43', will still be opened because the OR gate 49' receives the signal OLTDP from the gate 51 in the lane A. If the signal OLTDPD' is erroneously set to logic level 1, the AND gate 51' will nevertheless maintain the signal OLTDP' at logic level 0 because the signal TLIC' is at logic level 0. The torque motor 41 is thus not depowered.

A fault condition could arise in the lane A such that the signal OLTDPD is permanently at logic 1, and the output of the converter 46 is corrupt. This fault condition is detected by other means (not shown) and the signal TLIC is set to logic level 0. The output OLTDP of the AND gate 51 is then at logic level 0, thus allowing the torque motor 41' of the lane B to be powered when the signal TLTDPD' is set to logic level 0. The torque motor 41 of the lane A can be depowered in the absence of a second fault.

A fault condition could arise such that the signal OLTDP is at logic level 0 despite both the signals OLTDPD and TLIC being at logic level 1. However, the torque motor 41' will remain depowered because, in the absence of a second fault, the signal TLTDPD' is at logic level 1.

Operation with the lane B in control and the torque motor 41 depowered is symmetrical with respect to the operation described hereinbefore and will not, therefore, be further described.

It is thus possible to provide a torque motor depowering apparatus in which no single fault or failure can (a) result in power being supplied to the non-selected torque motor or (b) result in depowering of the torque motor of the selected lane. The apparatus is thus resistant to single faults and ensures that, when one lane is selected, the torque motor of the other lane is depowered so that no conflict can arise in control of actuators or the like by the torque motors. The apparatus is therefore well suited for use in applications where duplicate control systems are provided so that control is maintained in the event of the failure of one system. This is particularly important for ensuring safety in, for instance, aerospace applications and the apparatus has proved suitable for use with torque motors which control fuel metering valves in jet engines where reliability of operation is essential.

The apparatus may also be used with other devices, such as solenoids, and provides improved reliability of operation. The apparatus may thus be used with advantage wherever dual channel control of duplicate actuators is required.

What we claim is:

1. A device depowering apparatus for driving first and second loads, said apparatus comprising:
    first and second channels for respectively driving the first and second loads, each of said first and second channels comprising
    a device power supply line;
    switch means, operatively connected with said device power supply line, for depowering one of the first and second loads corresponding thereto; and
    control means for closing said switch means and supplying an other channel deselect signal in response to a channel select signal and for opening said switch means in response to an other channel deselect signal from said control means of an other of said first and second channels.

2. An apparatus as claimed in claim 1, in which said switch means of each of said first and second channels comprises an electromagnetic relay having normally open contacts.

3. A device depowering apparatus for driving first and second loads, said apparatus comprising:
    first and second channels for respectively driving the first and second loads, each of said first and second channels comprising
    a device power supply line, for depowering one of the first and second loads corresponding thereto;
    first and second switch means connected in series with said device power supply line and one of the first and second loads corresponding thereto; and
    control means for closing said first switch means and supplying an other channel deselect signal in response to a channel select signal and for opening said second switch means in response to an other channel deselect signal from said control means of an other of said first and second channels.

4. An apparatus as claimed in claim 3, in which said first switch means of each of said first and second channels comprises a first electromagnetic relay having normally open contacts and said second switch means of each of said first and second channels comprises a second electromagnetic relay having normally closed contacts.

5. An apparatus as claimed in claim 4, in which said control means of each of said first and second channels includes producing means for producing the other channel deselect signal as a varying signal and a transformer-isolated drive circuit driving said second electromagnetic relay.

6. An apparatus as claimed in claim 5, in which said drive circuit of each of said first and second channels comprises an isolation transformer having a primary winding for receiving the other channel deselect signal and a secondary winding having a secondary signal, rectifying and smoothing means connected to said secondary winding for rectifying and smoothing the secondary signal, and a power field effect transistor having a gate connected to said rectifying and smoothing means and a source-drain path connected to said second electromagnetic relay.

7. An apparatus as claimed in claim 5, in which said producing means of each of said first and second channels comprises an AND gate having a first input for receiving clock pulses and a second input for receiving the channel select signal.

8. A device control system having first and second lanes, each of the lanes comprising:
   control means for receiving input control data and a lane selection signal, for producing a channel deselect signal based on the input control data and the lane selection signal, and for producing a de-energize signal based on the input control data;
   power supply means for supplying power;
   driver means for driving a load in accordance with the input control data; and
   switch means, operatively connecting/disconnecting said power supply means to said driver means, for powering/depowering said driver means based on the de-energize signal and for powering/depowering said driver means based on the channel deselect signal received from another of the lanes.

9. A system as claimed in claim 8, wherein said switch means of the first lane can be depowered by either the de-energize signal produced by said control means of the first lane or the channel deselect signal produced by said control means of the second lane.

10. A system as claimed in claim 9, wherein said switch means comprises:
    an OR circuit having first and second input terminals and an output terminal, the first input terminal receives the de-energize signal and the second input terminal receives the channel deselect signal produced by said control means of the another of the lane, and the output terminal outputs a switch control signal; and
    switch circuit, operatively connected in series between said power supply means and said driver means, for receiving the switch control signal and for powering/depowering said driver means.

11. A system as claimed in claim 9, wherein said switch means comprises:
    first switch circuit for receiving the de-energize signal and for powering/depowering said driver means; and
    second switch circuit, operatively connected in series with said first switch circuit between said power supply means and said driver means, for receiving the channel deselect signal from the another of the lanes and for powering/depowering said driver means.

12. A system as claimed in claim 8, wherein said control means of each of the lanes comprise a transformer-isolated drive circuit for controlling said switch means.

13. A system as claimed in claim 8, wherein said driver means comprises an isolation transformer for receiving the de-energize signal.

14. A method for depowering one of first and second channels respectively driving first and second loads via a power supply, said method comprising the steps of:
    (a) receiving, at the first channel, input control data and a channel selection signal;
    (b) generating, at the second channel, a channel deselect signal based on the input control data and the channel selection signal;
    (c) generating, at the first channel, a de-energize signal based on the input control data; and
    (d) depowering the first channel driving the first load based on one of the de-energize signal generated in step (c) and the channel deselect generated in step (b).

* * * * *